United States Patent [19]

Statham

[11] 3,873,420

[45] Mar. 25, 1975

[54] NUCLEAR FUEL ELEMENT ASSEMBLIES

[75] Inventor: Eric Statham, Kirkham, England

[73] Assignee: United Kingdom Atomic Energy Authority, London, England

[22] Filed: Sept. 5, 1972

[21] Appl. No.: 286,340

[30] Foreign Application Priority Data
Sept. 28, 1971 United Kingdom ............. 45181/71

[52] U.S. Cl. .................. 176/77, 176/71, 176/73, 176/83, 176/84

[51] Int. Cl. ...................... G21c 3/36, G21c 3/00

[58] Field of Search ...... 176/41, 71, 73, 74, 75, 77, 176/83–85, 87

[56] References Cited
UNITED STATES PATENTS

| | | | |
|---|---|---|---|
| 3,163,584 | 12/1964 | Roche et al. ........................ | 176/41 |
| 3,413,196 | 11/1968 | Fortescue et al. .................. | 176/84 X |
| 3,676,297 | 7/1972 | Rennie et al. ..................... | 176/73 |
| 3,728,220 | 4/1973 | Prince et al. ...................... | 176/71 |

FOREIGN PATENTS OR APPLICATIONS

| | | | |
|---|---|---|---|
| 838,838 | 6/1960 | United Kingdom ................. | 176/71 |
| 1,126,323 | 9/1968 | United Kingdom ................. | 176/71 |
| 1,189,381 | 4/1970 | United Kingdom ................. | 176/74 |

OTHER PUBLICATIONS

T883,001, Pettinger, filed 2/19/69, published Feb. 2, 1971.

Primary Examiner—Leland A. Sebastian
Assistant Examiner—Roger S. Gaither
Attorney, Agent, or Firm—Larson, Taylor and Hinds

[57] ABSTRACT

A fuel element assembly for a high temperature reactor comprises a prismatic block having fuel containing bores and interstitial coolant conducting bores extending end-to-end. The fuel comprises stacks of annular compacts which line the fuel containing bores and define central coolant flow channels through the fuel.

3 Claims, 3 Drawing Figures

NUCLEAR FUEL ELEMENT ASSEMBLIES

BACKGROUND OF THE INVENTION

This invention relates to fuel element assemblies for high temperature gas cooled nuclear reactors.

The cores of high temperature gas cooled nuclear reactors frequently comprise stacked prismatic blocks of moderating material such as graphite, each block having fuel containing bores extending therethrough. In one known construction of fuel element assembly the fuel completely fills the fuel containing bores and is in the form of pencils of small cross-sectional area; cooling is effected by passing coolant through passages in the block running parallel to the fuel containing bores. In another known construction of fuel element assembly the fuel within each fuel containing bore is in the form of a discrete tubular or hollow fuel element over which coolant gas flows to effect heat exchange. The fuel elements each comprise stacked annular fuel compacts enclosed in inner and outer sheaths of graphite. This latter construction enables a relatively large concentration of fuel to be used in each fuel containing bore to enhance nuclear physics characteristics but suffers from the disadvantage that the requirement for graphite tubes greatly increases the cost.

SUMMARY OF THE INVENTION

According to the invention, in a fuel element assembly for a high temperature nuclear reactor, the fuel element assembly comprising a prismatic block of moderating material having fuel containing bores extending between opposed ends of the block, the block has interstitial coolant flow passages extending parallel to the fuel containing bores and the nuclear fuel comprises stacked annular compacts which line the bores and define a sole coolant flow passage through each bore and stack of compacts. A fuel element assembly according to the invention avoids the need for an outer sheath; adequate cooling is effected by the central flow passage through the fuel and the interstitial passages. An inner sheath for lining the coolant flow passage through the fuel can be manufactured from the slug of material trepanned from the block to produce the bore.

In some circumstances a sheath to isolate the fuel from coolant gas may be dispensed with in which case the inner sheath can be omitted because the stack of fuel compacts is adequately supported at its outer surface by the block.

DESCRIPTION OF THE DRAWINGS

Constructions of fuel element assemblies embodying the invention will now be described by way of example, with reference to the accompanying drawings wherein.

DESCRIPTION OF THE PREFERRED EMBODIMENTS

Figure 1:
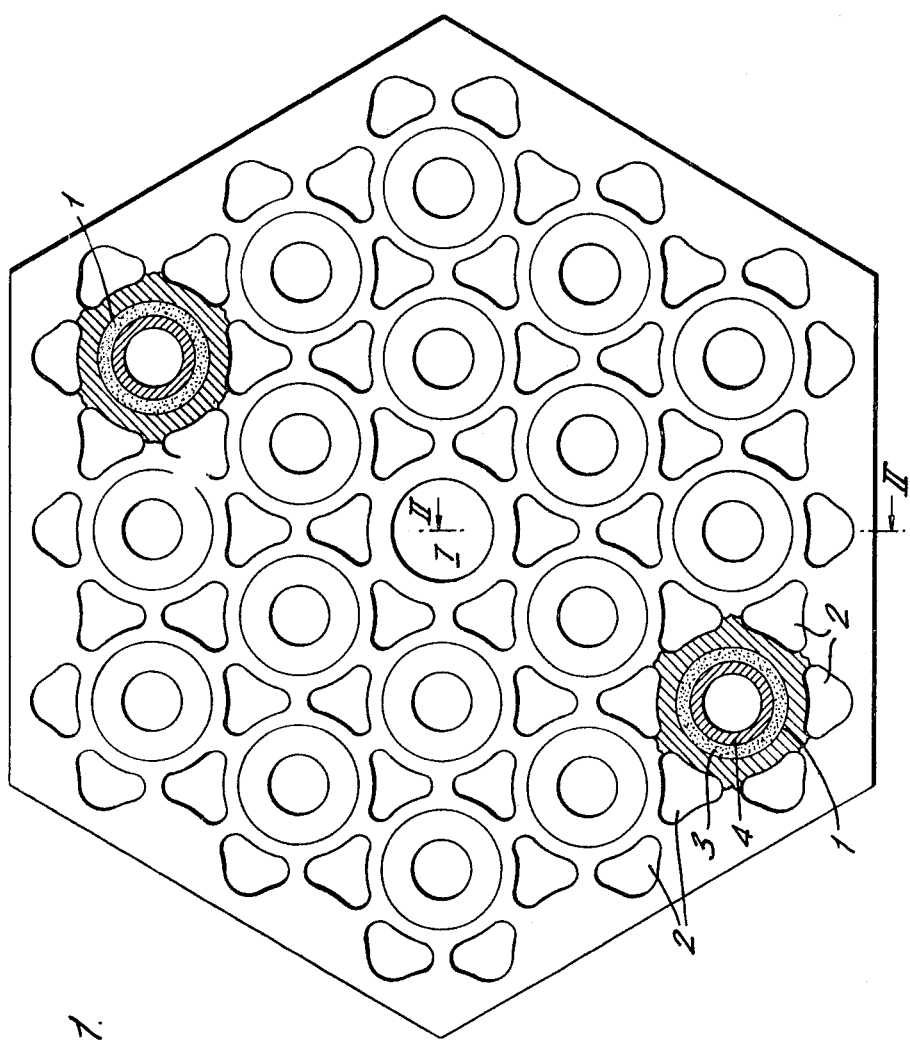
FIG. 1 is a fragmentary plan view of one fuel element assembly.
Figure 2:
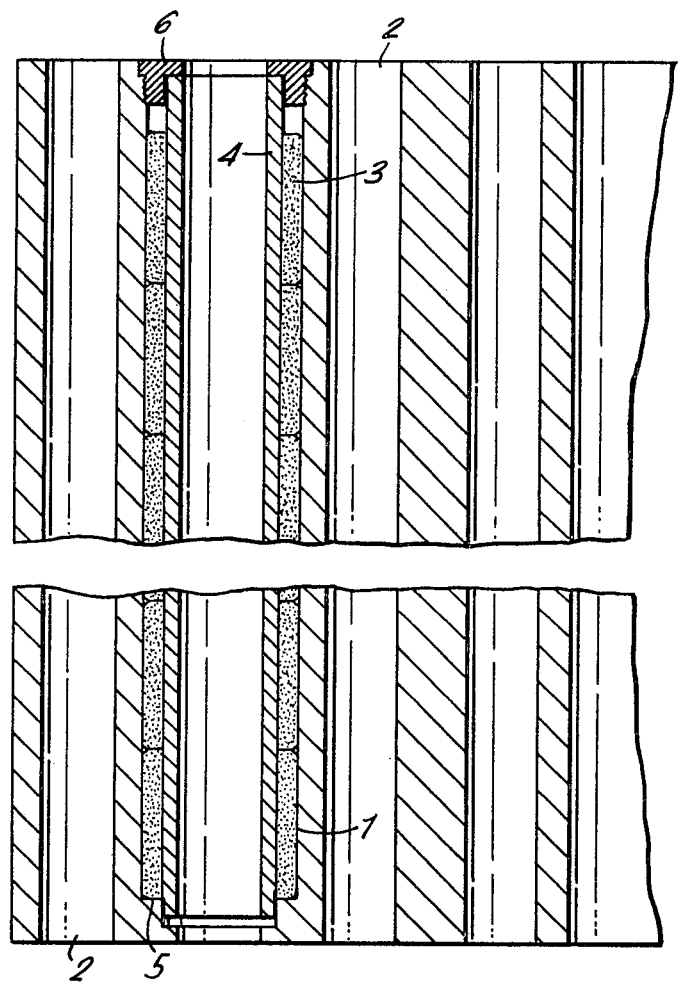
FIG. 2 is a fragmentary side view in section on line II—II of FIG. 1.

The fuel element assembly shown in FIGS. 1 and 2 comprises a prismatic block of graphite having fuel containing bores 1 and interstitial coolant flow passages 2 extending between opposed ends of the block.

The fuel comprises, in each bore 1, a stack of annular compacts 3 mounted on a graphite tube which forms an inner sheath 4. The stack of fuel members is supported in the bore by a step 5 and is retained by a screwed collar 6 at the upper end of the bore 1. The annular fuel compacts comprise uranium oxide particles coated with pyrolitic graphite and supported in a matrix material comprising a phenolic resin and graphite compound. The interstitial coolant flow passages 2 are of irregular cross-sectional shape their peripheral contours being generally parallel to the peripheral contours of the bores 1. A central bore 7 is provided for penetration by a reactor control rod and for engagement by a fuel element assembly handling facility.

In use in a nuclear reactor the fuel element assemblies are stacked side-by-side to form the reactor core. Coolant (helium) flow is downwardly through the central passages bounded by the sheaths 4 in the fuel containing bores and also through the coolant passages 2. The irregular contours of the passages 2 provide a large cross-sectional area for coolant flow and enhance heat transfer from the block to the coolant gas. The inner sheaths 4 are produced from the slugs of graphite trepanned from the block to produce the bores 1.

In an alternative construction (not shown) the interstitial coolant passages are of circular cross-section and are produced economically by use of multiple drilling head arrays.

Figure 3:
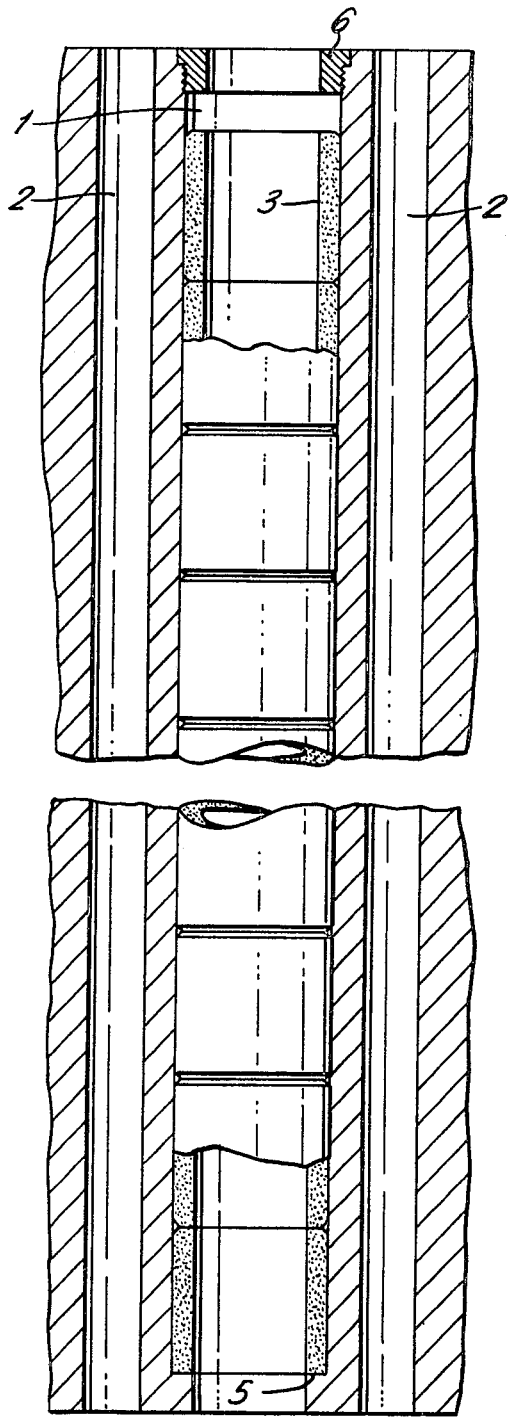
FIG. 3 is a fragmentary side view in section of a second fuel element assembly.

In the construction of fuel element assembly shown in FIG. 3 annular fuel compacts are supported on steps 5 in bores 1 in a graphite block and are retained by collars 6 in the upper ends of the bores. In this construction the inner sheath is omitted so that in use the coolant has direct contact with the fuel.

I claim:

1. A fuel element assembly for a high temperature nuclear reactor comprising a prismatic homogeneous block of graphite having discrete passages extending side-by-side through and between opposed ends of the block, a first group of passages being nuclear fuel containing bores and a second group of passages, formed interstitially of the fuel containing bores, being free of and forming gas coolant flow passages, the fuel containing bores being disposed in triangular lattice array to form tri-angular sub-groups of bores, each fuel containing bore being surrounded by a sub-group of equally spaced coolant flow passages, there being one coolant flow passage disposed with its longitudinal axis coincident with the longitudinal axis of each tri-angular sub-group of bores, the nuclear fuel comprising compacts of uranium oxide particles coated with pyrolytic graphite and supported in a matrix material comprising phenolic resin and graphite compound, said contacts being of annular form and stacked to line the bores and provide a sole coolant flow passage through each bore and stack of compacts.

2. A fuel element assembly according to claim 1 wherein each stack of annular compacts is mounted on a graphite tube which bounds the sole coolant flow passage through each bore and stack of compacts.

3. A fuel element assembly according to claim 1 wherein the inner cylindrical surface of the stack of annular compacts bounds the coolant flow passage through each bore.

* * * * *